Jan. 28, 1969   W. S. MARTIN   3,424,991
SEPARATED MIRROR FACE-PUMPED DISC LASER DEVICES
Filed Feb. 13, 1967

Inventor:
William S. Martin,
by John F. Ahern
His Attorney.

United States Patent Office 3,424,991
Patented Jan. 28, 1969

3,424,991
SEPARATED MIRROR FACE-PUMPED DISC
LASER DEVICES
William S. Martin, Latham, N.Y., assignor to General
Electric Company, a corporation of New York
Filed Feb. 13, 1967, Ser. No. 615,673
U.S. Cl. 330—4.3                                    7 Claims
Int. Cl. H01s 3/09

ABSTRACT OF THE DISCLOSURE

Discloses a face-pumped disc type laser device in which the reflective mirror constituting a portion of the laser module is physically separated from and deposited upon a separate planar surface other than one surface of the active disc. This separation prevents distortion of the mirror by virtue of distortion of the surface plane of the active disc by virtue of non-uniform absorption of heat within the active disc. May be used to produce either oscillator or amplifier type face-pumped laser device.

---

Figure 1:
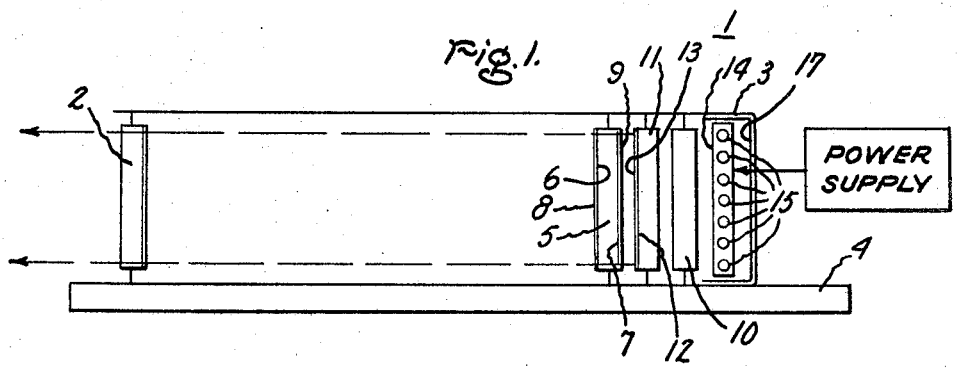

The present invention relates to laser apparatus capable of producing a beam of coherent electromagnetic radiation, and more particularly, to a face-pumped solid laser apparatus wherein distortion and beam divergence is minimized.

As is now well known to the art, laser devices are devices which may generate or amplify, and in both cases emit, coherent electromagnetic radiation at higher frequencies than microwave frequencies, generally in the infra-red and visible portions of the electromagnetic spectrum. For purposes of this description such wavelengths of radiation shall be denominated "optical radiation." The light emission from a laser device is characterized by its narrow wavelength (the light is essentially monochromatic), and by its spatial coherence or in-phase relationship. Because of this the divergence of laser beams is generally small and the laser beam is adapted to transmit high energies for great distances. Laser devices may utilize a solid medium such as a ruby crystal or neodymium glass, for example. They may use a gaseous medium, such as carbon dioxide or a helium-neon mixture, for example. Certain types of semiconductor devices with degenerate P–N junctions have been found suitable for the construction of injection-type lasers.

The devices of the present invention are concerned with solid laser devices of the neodymium glass type or of the ruby type, for example, wherein a highly perfect body of the laser material is fabricated in a shape having a width dimension or thickness dimension that is small as compared with its cross-sectional dimensions. In such structures the energy which creates "population inversion" necessary for coherent emission is incident upon one planar surface of the disc. Such devices are denominated as "face-pumped lasers." Face pumping is highly advantageous in that it permits the substantially uniform activation across the aperture with pumping radiation of a large diameter laser body, thus achieving high energy output without introducing undesirable effects of high energy pumping of rod-type laser bodies. Such devices are referred to as disc-type lasers. Such devices are generally in the form of a cylinder of revolution about a line that is normal to the plane of the faces of the disc and may be circular, elliptical or have other convenient cross-sections, as desired. The use of the word disc is not to be interpreted as limiting such devices to a right circular cylinder, although this is a simple configuration and will be used by way of illustration.

Coherent emission in laser devices requires "population inversion," a condition which exists when a substantial number of the possible atomic or molecular radiating species in the laser medium are raised to a metastable energy state above the ground state of the species. When this condition exists, an incident photon of the emission wavelength will stimulate radiative transitions from a number of these metastable states the emission of which is coherent and in phase. Population inversion is achieved by irradiation of the laser medium with a high intensity optical radiation of a wavelength of sufficient energy to raise the radiating species to a metastable state when absorbed thereby. Such irradiation and activation is referred to as "pumping" and the wavelength of the activating radiation is known as the pumping wavelength. The device for generating the "pumping wavelength" is referred to as the "pump" or "pumping means." The emission of stimulated coherent radiation in a laser oscillator is generally accompanied by the establishment of a standing wave of electromagnetic radiation between the opposed reflecting surfaces (or etalons) of a resonant structure.

In accord with the general operation of the face-pumped disc laser, it has been proposed, as for example, in the copending application of Joseph P. Chernoch, Ser. No. 491,921, filed Oct. 1, 1965, and assigned to the assignee of the present application, that one reflecting surface of the resonator including the laser disc be a coating of dielectric reflecting material upon the outermost surface of the laser disc. While this is a convenient and suitable means of providing a reflecting surface and results in no detrimental results in many instances, under certain circumstances, it results in distortion and divergence of the emitted laser beam. Thus, since the laser medium absorbs the pumping radiation and is heated thereby, and since the pumping radiation decreases in intensity as it is partially absorbed during passage through the disc, heat absorption is non-uniform through the disc and a temperature gradient exists within the disc. This results in non-uniform heating of the disc and distortion of the disc and some warping, particularly if the disc is thin. Such warping can result in distortion and alteration of the wavefront of the laser beam if the mirror is attached to the active disc since the mirror would also warp.

Accordingly, it is an object of the present invention to provide an improved face pumped disc laser device which adds minimal wavefront distortion to its output.

Yet another object of the present invention is to provide disc laser apparatus adding minimal wavefront distortion during operation at high pumping energies.

Briefly stated, in one embodiment of my invention I provide a face pumped disc laser oscillator device having a disc-shaped laser body with opposed planar faces in substantially optical parallelism. The active laser disc is interposed between a pair of reflecting mirrors or etalons which constitute a resonant structure within which a standing wave may be established. One of these mirrors is closely spaced to, but not touching, the laser disc and is coated on the surface thereof adjacent the active disc with a dielectric coating which is substantially transparent to the radiation used to pump or excite the laser and is substantially totally reflecting at the laser wavelength. A pumping means or power supply generally comprised of one or more suitable pumping energy emitting lamps is disposed on the side of the prominent mirror opposite from the laser disc. A filter means for removing unnecessary wavelengths from the pumping radiation may be interposed between the pump and mirror. When energized, the pumping means sends a high energy pulse or continuous supply of pumping radiation through the detached mirror into the active disc wherein a population inversion is created and a standing wave of electromagnetic radiation is established between the mirrors constituting the resonant structure, causing the emission of a narrow beam of coherent radiation of high intensity through a second mirror which is only partially reflective at the laser wavelength.

In another embodiment of the invention, a laser amplifier is comprised of a plurality of non-resonant modules each having only one mirror, the detached reflecting mirror through which the laser disc is pumped.

Figure 2:
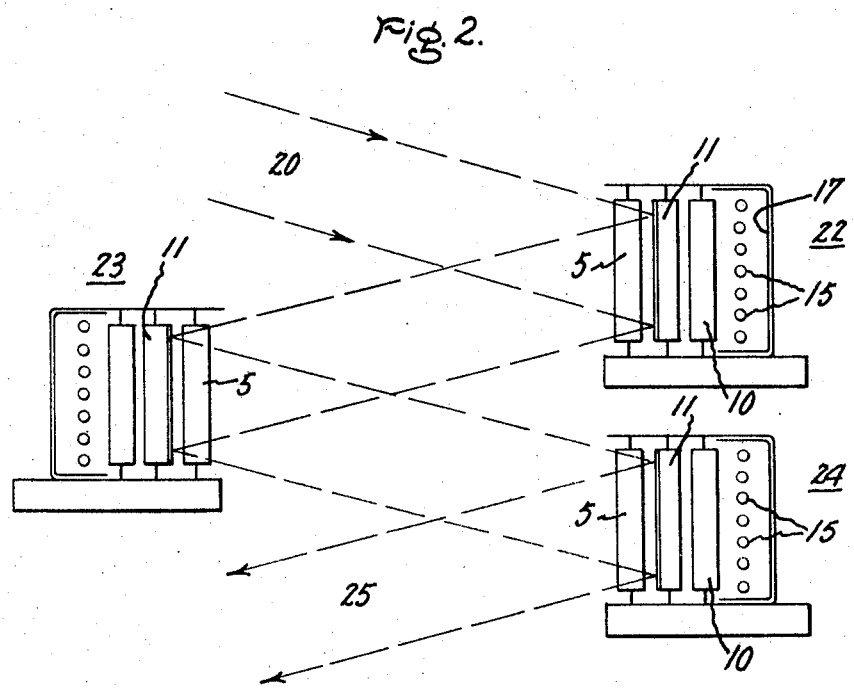

The features of my invention which I desire to protect herein are pointed out with particularity in the appended claims. The invention itself, however, together with further objects and advantages thereof may best be understood by reference to the following description, taken in connection with the accompanying drawing in which:

FIGURE 1 is a diagrammatic view in vertical cross-section of a laser apparatus constructed in accord with my invention wherein the apparatus is primarily suited for the generation of electromagnetic waves of optical frequency, and FIGURE 2 is a diagrammatic view of a serial arrangement of laser modules similar to that disclosed in FIGURE 1 and primarily adapted to form a high energy amplifier of coherent electromagnetic radiation.

In FIGURE 1, a laser oscillator device is comprised of a disc laser module 1 and a partially reflecting (at the laser emission wavelength) mirror 2, both of which are rigidly mounted and fixed within a rigid housing 3 which is rigidly supported upon a base or optical table 4. Module 1 includes a vertically mounted laser disc element 5 having substantially optically flat and substantially optically parallel opposed end surfaces 6 and 7, both of which are coated with low-reflection coatings 8 and 9, respectively, which minimize reflection at the laser emission wavelength. Closely juxtaposed to, and on the opposite side of laser disc 5 from semi-reflecting mirror 2, is located a detached mirror 11 which is comprised of a disc of optically transparent material having an optically smooth and polished face 12 which is coated with a coating 13 which is substantially totally reflecting at the laser emission wavelength and substantially transparent to the pumping wavelength and disposed in substantially parallelism with semi-reflective mirror 2. At the rear of housing 1 I provide a pumping means or optical initiating supply 14 for face pumping the disc laser device, which means may conveniently comprise one or more arc lamps 15, for example, mounted transversely across the housing and so positioned as to illuminate the rear face of laser disc 5 through detached mirror 11 with a pulse or a continuous input of high energy optical radiation of a pumping wavelength to cause a population inversion therein and the subsequent emission therefrom of coherent electromagnetic radiation. As illustrated in FIGURE 1 the pumping means comprises a bank of horizontally disposed arc lamps, seven in number, although a greater or less number may be utilized and vertical or other mounting is equally advantageous.

It is the function of pumping means 14 to supply a pumping optical input to laser disc 5. In the process of absorbing the pumping radiation to produce population inversion the laser disc absorbs some energy which causes heating thereof. This heating is not desirable but is a necessary consequence of pumping. It is, however, advisable to avoid any heating which can be avoided. Since the pump means in operation may become nearly black body in its spectral distribution, there are components thereof which contribute to heating of the laser disc but which do not contribute to population inversion. It is desirable to eliminate such radiation. To do this it is convenient to interpose between the pulsing means 14 and the laser disc 5 an optical filter 10 which has substantially complete transparency within the frequency of the pumping wavelengths and which is substantially opaque to shorter and longer wavelengths, so that the other wavelengths are absorbed thereby and the energy thereof need not be dissipated as harmful heating within laser disc 5. Accordingly, filter means 10 is essentially transparent within the pumping frequency range and absorbs unwanted radiation to decrease heating of the laser disc. Although this filter is not essential, it is found convenient, and substantially increases the effectiveness of the device. As an alternative arrangement, a filter or filters may be "wrapped" about each lamp of the pumping means.

The innermost section of housing 3 immediately adjacent and surrounding pulsing means 14 is surrounded with a suitable shield which is effective to substantially reflect all of the light output thereof in the direction of laser disc 5. Conveniently, shield 17 may be in the form of an alumina cup fitted within the end of housing 3 and surrounding pulsing means 14.

Other materials from which elements of the device of FIGURE 1 may conveniently be constructed are substantially as follows: Laser disc 5 may be comprised of a neodymium glass as for example, that commercially obtainable from American Optical Company under the number AO–3835 and may conveniently be of approximately 3 inches in diameter with a circular cross-section and having a thickness of from .4 to .8". The faces thereof are polished to substantially optical smoothness and are optically flat to within approximately $1/10$ wavelength at a wavelength of 1.06 microns, the wavelength of coherent light emitted from a neodymium glass laser. Alternatively disc 5 may be of ruby or any other available and useful solid laser material.

The neodymium glass laser material which is used in the preferred embodiment of the present invention is sensitive and strongly absorbing to pumping optical radiation in the range of approximately 5000 to 9000 AU and is operative when so pumped to emit coherent radiation at approximately 1.06 microns. It is desirable to specify that both faces of the laser disc be coated with a film that imparts low-reflecting characteristics to the surfaces at the laser wavelength, many of which are well known in the art.

The mirrors which constitute the resonant structure in the laser device of FIGURE 1, namely remote mirror 2 and proximate detached mirror 11, are conveniently of fused silica and may be readily obtained from Perkin-Elmer Company of Norwalk, Conn., to specification. In one embodiment of the invention the discs were specified to be of 3" in diameter and 0.40" thickness, although any higher thickness compatible with appropriate transmission of the pumping light is appropriate. The end faces should ideally be optically flat to approximately $1/10$ wavelength at a wavelength of 0.6 micron and the surface which is to be the mirror surface i.e., the surface facing the disc laser should be coated to, for example, 99.8% true reflectivity for from 0 to 10° from normal incidence at 1.06 micron wavelengths and should be (in the case of the detached mirror which is located between the laser disc and the pumping means) suited for good optical transmission at a wavelength of from 5000 to 9000 Angstrom units with hemispherical illumination. The other face of the detached mirror to be located between the laser disc and the pumping means should have a low reflection coating adapted to pass with a minimum reflection wavelengths of from 5000 to 9000 Angstrom units. The remote side of the remaining mirror (the one remote) from the laser disc) should be coated for optimum transmissivity at 1.06 microns. Alternatively, it may be desirable that the mirror surface be on the remote face of the mirror disc from the laser. If so, desired the layers may then be reversed.

The filter means utilized to reduce the wavelength band passing from the pumping means to the laser disc may be any suitable filter adapted to pass electromagnetic optical radiation in the 5000 to 9000 Angstrom unit wavelength band and may conveniently be a glass enclosed tank of $1/16$" thick solution of 1% by weight of potassium chromate in water, the entire assembly being unitary in nature with the glass plates mounted in parallelism and the space therebetween filled to overflowing with the potassium chromate solution and sealed.

In order to prevent spurious modes of oscillation it is desirable that the edge surfaces of the laser disc be made non-reflective. This may be accomplished, for example, by sandblasting or grinding of the surfaces to roughen the edge, by beveling the edges to prevent transverse modes of oscillation, but is conveniently accomplished in the size laser disc described herein by painting the ground edge surface with a flat black paint. The edge surface of mirror 11 is conveniently given an optical polish and is made normal to the disc surfaces in order to prevent the loss of any incident pumping radiation through lateral transmission by providing total internal reflection.

Pumping means 14 may conveniently be comprised of any desirable or desired number of arc lamps emitting in the desired frequency range. For example, using a neodymium glass disc, a xenon vapor lamp which emits in the 5000 to 9000 Angstrom range with strong lines is suitable. In the illustrated embodiment, seven such lamps 15 are mounted in parallel in relatively close juxtaposition to the laser disc, and appropriately water cooled with suitable water jackets (not shown) to prevent overheating thereof.

In operation, the lamps are connected in series and fired by means of external triggers. Using three such EG and G xenon arc lamps type FX–47 having a 3¼″ arc length and individual water jackets, when the pumping lamps are triggered, as for example with a 550 microsecond pulse, approximately 6000 joules of energy are passed through the potassium chromate and water filter, through the detached mirror, and into the laser disc. This high incident pumping energy causes a population inversion to occur within laser disc 5 so that coherent emission may occur. Since the material of mirror 11 is substantially transparent to the pumping radiation there is little or no heating thereof, and since the stimulated emission does not pass through the reflecting coating 13 thereupon, there is not sufficient heating of the mirror to cause differential expansion and a resultant distortion of the reflected laser beam. If there is any distortion of the disc itself this does not effect the surface plane of mirror 11, thus giving rise to the unique advantage of the detached mirror as opposed to the active mirror type face-pumped laser as set forth in the aforementioned copending Chernoch application. On the other hand due to the fact that the detached mirror is closely disposed to the active laser disc there is little or no loss of energy due to the separation of the mirror and the same advantages obtained with the face-pumped mirror are also obtained with the device of the present invention.

FIGURE 2 of the drawing illustrates a face-pumped disc laser amplifier utilizing three face-pumped laser modules similar to module 1 of FIGURE 1 of the drawing. In FIGURE 2 a beam of coherent optical radiation 20 is incident upon module 22 from which it is reflected with amplification to module 23 from which it is reflected with amplification to module 24 from which it is reflected as an amplified coherent beam of optical radiation 25. In each instance in modules 22, 23 and 24 amplification of the beam occurs within laser disc 5 with pumping energy being supplied from pumping means 15 through filter means 10. The apparatus illustrated in FIGURE 2 is adaptable for applications in which a higher energy output than may be obtained from a laser oscillator is required.

In FIGURE 2, the coherent beam 20 may be received from a laser oscillator such as illustrated in FIGURE 1 of the drawing, or may be generated by a different configuration but at the same frequency at which the disc laser elements 11 are adapted to amplify coherent emission so that maximum amplification may be obtained. The amplifier illustrated in FIGURE 2, while similar in construction in each module to the module in FIGURE 1, is characterized by its receiving a beam generated or amplified by a prior laser module and which is incident upon the laser disc and separated mirror at an angle of incidence and is reflected therefrom at the conjugate angle of reflection.

Due to the fact that there is no reflection back and forth between the mirrors of the adjacent modules this amplifier is a non-resonant structure and standing waves of electromagnetic energy are not set up between opposed mirrors.

The particular advantage of the present invention is maintaining a distortionless mirror which prevents alteration of the wave-front upon reflection and permits the maintenance of an optically collimated beam. The passage of beam 20 through the system and its subsequent reflection from mirrors 11 in modules 22, 23, and 24 does not appreciably effect the beam divergence angle. On the other hand if the active mirror scheme were employed and the reflection coating which constitutes mirror 11 were mounted upon the laser disc surface, heating and other effects, particularly at high pumping levels, can cause warping of the mirror. A diffraction limited collimated laser beam reflected from such a warped mirror may have its divergence angle doubled. Such doubling could result, in the far-field region, in a four-fold drop in intensity due to the area factor. This may be compared with the lack of any appreciable increase in divergence upon reflection from a separate mirror in accord with the present invention, and no appreciable loss of intensity is a result. A correcting lens, for example, can substantially compensate for a warped mirror at any instant in time but the amount of warping changes continuously during the pumping and therefore a passive lens is ineffective in correcting for mirror warpage when the duration of the laser beam is comparable to the duration of the pumping. Therefore, it is for use with long duration laser pulses that the separate mirror is especially advantageous, although it is also useful under other conditions.

While only certain preferred features of the invention have been shown by way of illustration, many modifications and changes will occur to those skilled in the art. It is therefore to be understood that the appended claims are intended to cover all such modifications and changes as fall within the true spirit and scope of the invention.

What I claim as new and desire to secure by Letters Patent of the United States is:

1. A laser device comprising:
  (a) A first laser disc of highly perfect solid coherent light emitting material having an axial dimension that is small as compared with the transverse dimension thereof and having a pair of opposed substantially parallel optically flat end surfaces;
  (b) A second disc of substantially the same cross-sectional configuration and area as said first disc in close physical juxtaposition, substantial parallelism, and optically coupled relationship to said first disc and being highly transmissive to a wavelength of optical radiation for pumping said first disc to produce population inversion therein;
    (b1) Said second disc being coated upon the face adjacent said first disc with a film that is substantially completely reflecting to a first electromagnetic wavelength at which said first disc emits coherent optical radiation when properly stimulated and substantially transparent to a second electromagnetic wavelength which is adapted to pump said first disc;
  (c) Pumping means adapted to emit a high intensity of optical radiation at said second electromagnetic wavelength when energized juxtaposed on the side of said second disc remote from said first disc and optically coupled therethrough with said first disc;
    (c1) Said pumping means being operative when energized to emit pumping radiation which passes through said second disc and pumps said first disc to population inversion which is conducive to the emission of coherent optical radiation.

2. The laser device of claim 1 wherein both end surfaces of said laser disc are provided with coatings which provide relatively low reflectivity at said first wavelength.

3. The laser device of claim 2 wherein means are provided between said second disc and said pumping means to filter out from the output of said pumping means unnecessary radiation.

4. The laser device of claim 2 wherein said first and second disc and said pumping means are rigidly and accurately positioned with respect to one another to form a laser module which minimizes wavefront distortion of its optical output.

5. The laser device of claim 2 and further including a third disc mounted remote from said first disc as compared with the proximity of said second disc thereto and on the side opposite thereof opposite from said second disc.

6. The laser device of claim 5 wherein said third disc is in substantial optical parallelism with said second disc and is partially, but not totally reflective to optical radiation of said first wavelength and defining with said second disc a resonant structure.

7. The laser device of claim 4 wherein a plurality of said modules are optically coupled to receive and amplify coherent optical radiation at said first wavelength.

No references cited.

ROY LAKE, *Primary Examiner.*

D. R. HOSTETTER, *Assistant Examiner.*

U.S. Cl. X.R.

330—53; 331—94.5